United States Patent [19]

Zahn et al.

[11] 3,709,601
[45] Jan. 9, 1973

[54] METHOD AND APPARATUS FOR THE PRODUCTION OF COLOR PRINTS

[75] Inventors: Wolfgang Zahn, Munich; Günter Findeis, Unterhaching; Dieter Müller, Leverkusen, all of Germany

[73] Assignee: AGFA Gevaret Aktiengesellschaft Leverkusen, Germany

[22] Filed: March 23, 1970

[21] Appl. No.: 21,670

[30] Foreign Application Priority Data

March 21, 1969 Germany...................P 19 14 360.3

[52] U.S. Cl. .........................355/38, 355/35, 355/36
[51] Int. Cl. ..............................................G03b 27/78
[58] Field of Search............................355/35, 36, 38

[56] References Cited

UNITED STATES PATENTS

| | | | |
|---|---|---|---|
| 3,519,347 | 7/1970 | Bowker et al | 355/38 X |
| 3,408,142 | 10/1968 | Hunt et al | 355/38 |
| 3,516,741 | 6/1970 | Thaddey | 355/38 X |
| 2,847,903 | 8/1958 | Modney | 355/36 |
| 2,949,811 | 8/1960 | Weisglass | 355/35 |
| 3,421,817 | 1/1969 | Schwardt | 355/38 X |
| 3,469,105 | 9/1969 | Stasey | 355/38 X |

Primary Examiner—Samuel S. Matthews
Assistant Examiner—E. M. Bero
Attorney—Michael S. Striker

[57] ABSTRACT

Images of color transparencies on strips of exposed photographic film which are joined end-to-end to form an elongated web are reproduced onto successive portions of a roll of photosensitive material by exposure to printing light wherein the ratio of primary colors corresponds to the average ratio of primary colors in all transparencies of an entire strip. Such ratio is determined at a scanning station which is located ahead of the printing station, and successive transparencies of each strip are caused to enter a magazine between the two stations prior to exposure of transparencies in the respective strip to printing light.

8 Claims, 2 Drawing Figures

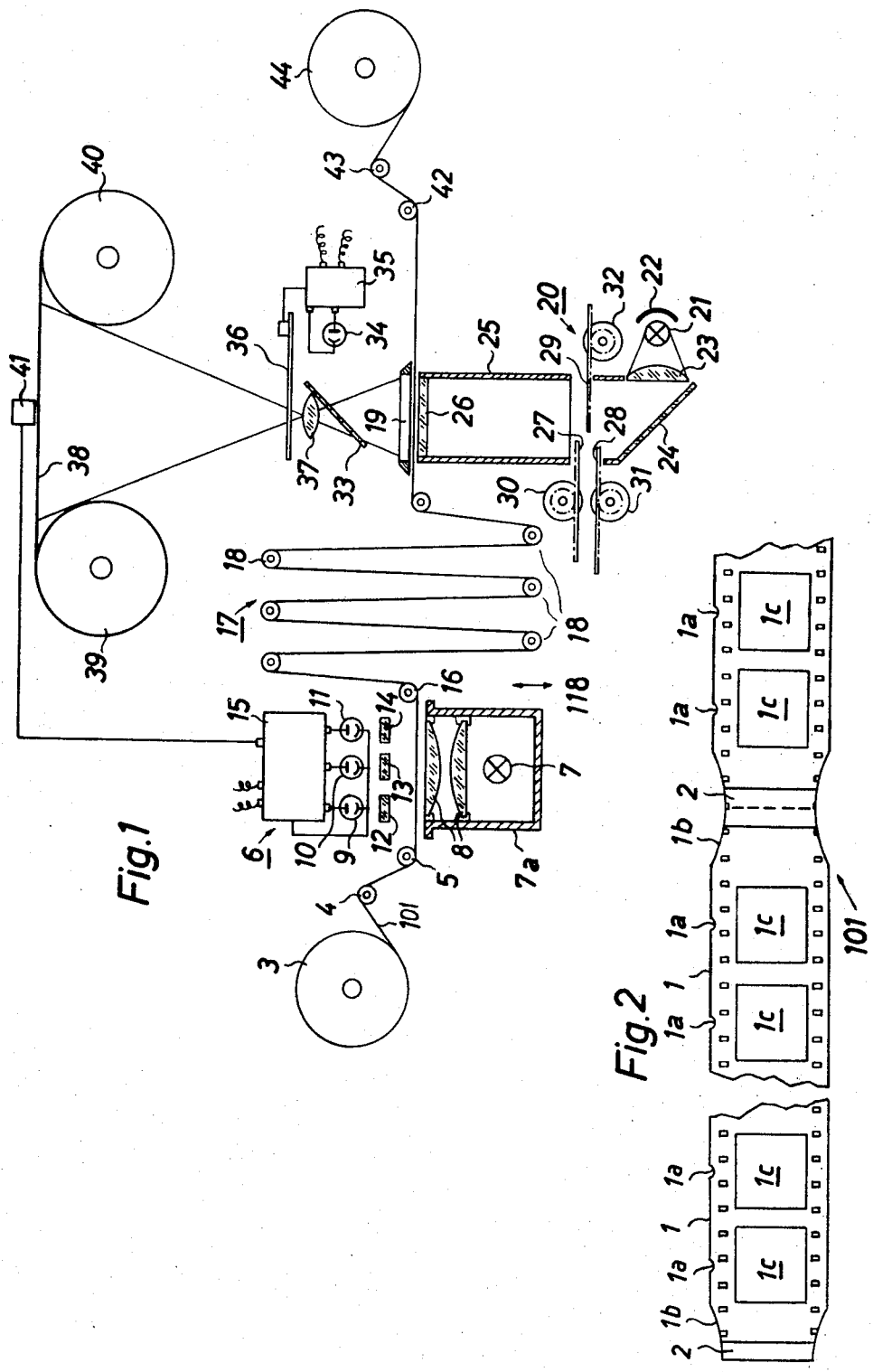

METHOD AND APPARATUS FOR THE PRODUCTION OF COLOR PRINTS

BACKGROUND OF THE INVENTION

The present invention relates to a method and apparatus for the production of color prints, and more particularly to improvements in methods and apparatus for automatic printing. Still more particularly, the invention relates to improvements in exposure determination in a color printer, i.e., to improvements in assignment of values to a particular set of exposure parameters for a given negative or group of negatives.

The presently known color printing methods and apparatus rely on the assumption that the negative records of most scenes will integrate to gray or a hue near gray, i.e., that the ratio of the three primary colors (red, blue and green) in an average color transparency is always within a rather narrow range, namely, the developing of a photosensitive material which was uniformly illuminated with light passing through an average color transparency would produce a neutral gray. Therefore, such conventional printers regulate the exposure time and the intensity of illumination in the three primary colors in such a way that uniform distribution of printing light on printing paper would also produce neutral gray. This compensates for eventual color shifts or other color variability due to storage effects, as well as for improper development of transparencies, and results in the production of reasonably satisfactory prints provided that the negative records of the entire print will integrate to gray. This holds true for a rather high percentage of amateur roll-film color negatives. However, the just described printers fail to furnish satisfactory reproductions of negatives wherein one of the primary colors predominates, especially if such predominance is rather pronounced. The result is a substantial disparity between the coloration of originals and prints, i.e., the prints are not salable and must be discarded.

It is also known to effect partial compensation for the predominance of a particular color in a color transparency. Such procedure is a compromise where merely reduces one error but creates another so that the quality of prints is not much more satisfactory than the quality of prints obtained in accordance with the previously discussed conventional method.

SUMMARY OF THE INVENTION

An object of the invention is to provide a method of automatic printing of color prints from color negatives in such a way that the number of rejects is less than in accordance with presently known methods.

Another object of the invention is to provide a novel and improved method of automatic printing which can be resorted to for mass production of color prints from amateur roll-film color negatives.

A further object of the invention is to provide a novel and improved automatic printing apparatus.

The method of the present invention is employed for reproduction of images of color originals onto photosensitive material and comprises the steps of photoelectrically scanning a plurality of originals, particularly a full strip or roll of color transparencies, for determining the average ratio of the three primary colors red, blue and green, and photographing the images of such plurality of originals by exposing the photosensitive material to printing light wherein the ratio of the primary colors is a function of such average ratio.

The exposing step may comprise placing into the path of printing light color filters of maximum density so that light passing through all of the plurality of originals produces a neutral gray, measuring the total amount of printing light to which each of the plurality of originals is exposed, and terminating the exposure of originals to printing light when the respective total amount at least approximates a predetermined value.

If it is desired to eliminate the detrimental influence of the Schwarzschild effect, the exposing step comprises placing into the path of printing light color filters of maximum density so that light passing through all of the plurality of originals produces a neutral gray, and weakening the printing light which impinges upon the originals of such plurality at a rate which is inversely proportional to the intensity of printing light.

The exposing step may also comprise successively exposing each of the plurality of originals to light in each of the three colors for an interval of time which is proportional to the percentage of such colors in the average ratio so that light passing through all of the plurality of originals produces a neutral gray, measuring the total amount of printing light to which each of the plurality of originals is exposed, and terminating the exposure of each of the plurality of originals to printing light when the respectige total amount at least approximates a predetermined value.

The scanning step preferably comprises placing the originals of the plurality seriatim into registry with a scanning station, measuring the percentage of each of the primary colors in the original which registers with the scanning station, and averaging the results of measurements for each of the primary colors to thus arrive at the aforementioned average ratio.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic partly elevational and partly sectional view of an apparatus which embodies the invention; and FIG. 2 is a fragmentary plan view of a web consisting of exposed photographic film strips which can be processed in the apparatus of FIG. 1.

DESCRIPTION OF THE PREFERRED EMBODIMENTS

FIG 1 illustrates an automatic printing apparatus which can process exposed film strips 1 of the type shown in FIG. 2. Each strip 1 contains a plurality of originals or transparencies 1c which form a row and whose images are to be reproduced on photosensitive materials, e.g., on printing paper 38 which is stored on a supply reel 39 and collected by a takeup reel 40. The strips 1 are joined end-to-end by adhesive-coated uniting bands 2 and are provided with coding notches 1a, each in registry with one of the transparencies 1c. Concave coding notches 1b are provided in the abutting ends of the strips 1 to facilitate detection of splices during travel of the web 101 consisting of two or more film strips 1 through the apparatus of FIG. 1. the notches 1a and 1b are applied in the processing plant subsequent to splicing of the strips 1.

The web 101 is stored on a supply spool 3 and is collected by a takeup spool 44. Successive increments of the web 101 are caused to pass along a predetermined path over a spring-biased tensioning roll 4, thereupon over a guide roll 5 and through a monitoring or scanning station 6. The later can receive one frame 1c at a time and accommodates a scanning unit including a lamp or an analogous light source 7 located at one side of the path of the web 101 and arranged to illuminate successive frames 1c with light which passes through a condensor lens system 8. The lamp 7 and the elements of the lens system 8 are installed in a lamp housing 7a. It will be noted that the overall length of the scanning station equals the length of a single frame 1c, i.e., it is a small fraction of the length of a strip 1.

Three photoelectric cells 9, 10, 11 are adjacent to the path of the web 101 opposite the condensor lens system 8 and at a sufficient distance from the light source 7 to ensure satisfactory mixing of light. The photocells 9, 10, 11 are respectively located behind color filters 12, 13, 14 each of which permits passage of one of the three primary colors red, blue and green. The cells 9-11 are connected with an evaluating circuit 15 which will be described below.

The web 101 is thereupon guided over a fixedly mounted guide roll 16 and through a storing unit or magazine 17 including a set of guide rolls 18 which define a meandering path of a length preferably corresponding to that of the longest strip 1. The capacity of the magazine 17 can be varied, for example, by moving the lower set of rolls 18 toward or away from the upper set as indicated by the arrow 118.

The magazine 17 is followed by a printing or photographing station including a window 19 located opposite an illuminating device 20 comprising a source 21 of printing light and an internally mirrored light duct 25. The light source 21 is located in front of a reflector 22 which directs light through a condensor lens 23 and against a suitably inclined cold light mirror 24 which reflects the light into the duct 25. A light dispersing plate 26 at the discharge end of the duct 25 transmits light which passes through one transparency 1c at a time, i.e., through that transparency which registers with the window 19.

The inlet end of the duct 25 is spaced from the mirror 24 to permit introduction of maximum-density subtractive color filters 27, 28, 29 which are respectively movable into and from the path of printing light by servomotors 30, 31, 32 or analogous displacing means receiving signals from the evaluating circuit 15. The operative connection between the circuit 15 and servomotors 30-32 is such that, when one of the three primary colors predominates in the transparencies 1c of a strip 1 in the magazine 17, the corresponding subtractive filter 27, 28 or 29 is moved further into the path of printing light when the respective transparencies are moved seriatim into registry with the window 19. The subtractive filter which excludes only the corresponding primary color is then positioned to extend further into the path of printing light to ensure proper color balance for the entire series of reproductions of images on the corresponding film strip 1.

A partly transmitting inclined mirror 33 is located behind the window 19 to direct a certain amount of printing light against a photoelectric cell 34 which controls a shutter 36. The cell 34 is equally sensitive to all colors and measures the total amount of printing light during an exposure. This cell is connected with a circuit 35 which opens and closes the shutter 36, preferably by way of an electromagnet.

A portion of the printing paper 38 is located behind the mirror 33 to be exposed to light which is caused to pass through an objective lens 37.

An encoding or identifying device 41 is electrically connected with the circuit 15 and serves to apply to the back of each print a set of indicia representing the setting of color filters 27-29 for the particular exposure. It is clear that the connections between the identifying device 41 and servomotors 30-32 on the one hand and the circuit 15 on the other hand include suitable time delay elements which insure that the prints are properly identified. The web 101 passes beyond the window 19, around rolls 42, 43, and is collected on the spool 44. The roll 43 is a spring-biased tensioning roll.

The operation:

When the last frame 1c of a strip 1 moves beyond the scanning station 6, a suitable detector which tracks the notches 1b resets the circuit 15 to zero. As the next following strip 1 moves through the station 6, a scanning operation is performed in response to detection of each notch 1a. Such scanning operation involves sampling of each of the three primary colors. The resulting signals are transmitted to three discrete signal storing units of the circuit 15. Thus, each storing unit receives as many signals as the number of frames 1c in a given strip 1. When the next pair of notches 1b reaches the station 6, the circuit 15 averages the signals in each storing unit and transmits the resulting signals to the servomotors 30-32. Thus, each of the filters 27, 28, 29 is positioned as a function of the average percentage of the corresponding primary color in the frames 1c of an entire strip 1. The adjustment of filters 27-29 preferably takes place when an entire strip 1 has passed beyond the scanning station 6 and is accommodated in the magazine 17, for example, in response to detection of notches 1b at the trailing end of such strip. As stated before, the capacity of the magazine 17 is preferably variable so that it can accommodate longer or shorter strips.

FIG. 1 shows that the filters 27-29 are remote from the light dispersing plate 26. This insures that, due to mixing of light in the duct 25, the frame 1c in the window 19 is transversed by a homogeneous light beam, i.e., that the transparency is illuminated by light of uniform intensity and color distribution.

The photoelectric cell 34 determines the total amount of printing light which passes through a transparency 1c at the printing station and closes the shutter 36 when such amount reaches or at least approximates a fixed value. Thus, the total amount of light to which a transparency is exposed at the printing station is a function of the exposure time. Such mode of exposure does not take into consideration the Schwarzschild effect which might affect the quality of prints. The detrimental influence of such effect can be reduced or eliminated by positioning the mirror 33 in a way to provide in the objective plane room for a light intensity regulator, e.g., a diaphragm having a plurality of apertures whose size is inversely proportional to the intensity of printing light, or analogous light weakening means. The photoelectric cell 34 then merely serves as a means for accurate determination of the desired total amount of printing light which results in minor fluctuations of exposure time. Such fluctuations are not sufficient to affect the quality of prints due to the Schwarzschild effect.

The printing lamp 21 can be replaced with a signal-operated flash tube. Even though the light output of such tube is very high, its utilization for exposure of transparencies to light in the three colors presents no serious problems.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for reproducing the images of color transparencies onto photosensitive material, a combination comprising means for transporting a strip having a plurality of color transparencies along predetermined first and second stations; scanning means provided at said first station for scanning the plurality of transparencies along the strip for determining the ratio of the average intensity of the primary color blue of the scanned plurality of transparencies to the average intensity of the primary color green of the scanned plurality of transparancies and to the primary color red of the scanned plurality of transparencies; and photographing means provided at said second station for reproducing the images of said plurality of transparencies by exposing photosensitive material to printing light wherein the ratio of intensities of light in said primary colors is a function of said ratio of average intensities of the primary colors in said plurality of transparencies.

2. A combination as defined in claim 1, wherein said scanning means comprises a source of light arranged to direct light through successive transparencies of said plurality of transparencies, and photoelectric means for measuring the percentage of said primary colors in the light passing through the transparency which registers with said source of light.

3. A combination as defined in claim 2, wherein said scanning means further comprises evaluating means for averaging the results of measurements performed by said photoelectric means.

4. A combination as defined in claim 1, further comprising storing means located at a third station between said first and second stations and arranged to accommodate all of said plurality of transparencies of said strip before the foremost transparency reaches said second station.

5. A combination as defined in claim 4, wherein at least two pluralities of transparencies are united into a continuous web and said storing means is arranged to fully accommodate that one of said pluralities of transparencies which contains the largest number of transparencies.

6. A combination as defined in claim 1, wherein said photographing means comprises a source of printing light arranged to direct printing light through a transparency at said second station and against photosensitive material behind the transparency at said second station, a plurality of subtractive color filters of maximum density movable into and from the path of said printing light, and displacing means for moving said filters into the path of printing light to the extent which is a function of the percentage of corresponding primary colors in said ratio of average intensities.

7. A combination as defined in claim 1, wherein said photographing means comprises a source of printing light arranged to direct printing light through those transparencies positioned at said second station, a plurality of color filters, one for each of said primary colors, and displacing means for moving said filters across the entire path of printing light for intervals of time whose length is a function of the percentage of the respective color in said ratio of average intensities.

8. A combination as defined in claim 7, wherein said photographing means further comprises means for terminating the exposure of photosensitive material to printing light when the total amount of printing light, while a transparency is positioned at said second station, at least approximates a predetermined value.

* * * * *